United States Patent [19]
Alft

[11] Patent Number: 5,881,215
[45] Date of Patent: Mar. 9, 1999

[54] APPARATUS AND METHODS FOR PROVIDING ROBUST POWERING

[75] Inventor: Mark A. Alft, Wichita, Kans.

[73] Assignee: LSI Logic Corporation

[21] Appl. No.: 766,920

[22] Filed: Dec. 13, 1996

[51] Int. Cl.[6] .................................................. G06P 11/30
[52] U.S. Cl. ............................... 395/182.12; 395/182.12; 395/750.01
[58] Field of Search ........................ 395/182.12, 182.2, 395/750.01, 750.08; 307/131

[56] References Cited

U.S. PATENT DOCUMENTS

| | | | |
|---|---|---|---|
| 4,607,330 | 8/1986 | McMurray et al. | 395/182.12 |
| 5,151,907 | 9/1992 | Robbins | 395/182.2 |
| 5,301,153 | 4/1994 | Johnson | 365/200 |
| 5,325,363 | 6/1994 | Lui | 371/8.1 |
| 5,500,940 | 3/1996 | Skeie | 395/183.01 |
| 5,557,738 | 9/1996 | Townsley et al. | 395/182.12 |
| 5,623,596 | 4/1997 | Townsley et al. | 395/182.12 |
| 5,644,175 | 7/1997 | Galm | 307/131 |
| 5,754,686 | 5/1998 | Yamamoto et al. | 395/750.01 |

OTHER PUBLICATIONS

PC Magazine, Oct. 8, 1996; "Inside"; p. 4.
Computer Shopper; Sep., 1996; "Zenon Makes High End".
PC World, Sep., 1996; Fastest Desktop on the Planet; pp. 1–8.

*Primary Examiner*—Robert W. Beausoliel, Jr.
*Assistant Examiner*—Pierre E. Elisca
*Attorney, Agent, or Firm*—David L. Clark; Wayne P. Bailey

[57] ABSTRACT

A power system and method utilizes two independent AC lines to power an N+1 power supply configuration. The AC lines are selectively switched to supply power to the N+1 power supply configuration in response to power failure on one of the AC lines. The distribution system takes advantage of the N+1 configuration by always powering at least N power supplies. Sequencing of the switching is also monitored for incorrect power switching. Upon detection of incorrect power switching relays are forced open.

53 Claims, 3 Drawing Sheets

5,881,215

APPARATUS AND METHODS FOR PROVIDING ROBUST POWERING

I. BACKGROUND OF THE INVENTION

A. Field of the Invention

The present invention relates generally to providing robust power, and in particular to apparatus and methods for providing robust power using switching to selectively distribute alternating current (AC) power to several direct current (DC) power supplies.

B. Description of the Prior Art

Many power systems need robust backup power to minimize, or eliminate, power outages. A fault may occur along one of the lines, such as overloading or shorting, causing the corresponding circuit breaker to clear at the main circuit breaker box and trip open. Other failures are also possible. For example, a service technician working on something may accidentally grab the wrong power cord and unplug it, a line cord from the subsystem to the wall outlet could become damaged, or the circuit breakers (denoted by "CB") could malfunction and open. It is also possible that a line filter which conditions the power coming from an AC box could quit operating, open up, and not let all the power through. These and other faults along the line, all the way back to the main circuit breaker in the building, could cause AC power to not be available on an AC line.

One common approach to providing more robust power uses a primary AC power source and a standby AC power source. The standby AC power source is switched in when the primary AC power source goes down. In this configuration, however, all power supplies are connected, via a switch, to the primary and standby AC power sources. The switch is thrown from the primary supply to the standby supply when a problem occurs in the primary AC power source. Switching to the other supply, however, introduces a delay because all power supplies are down for at least a period of time. This system also fails to compensate for problems in a single power supply.

An alternate approach to power supply robustness is to have redundant power supplies. If a power supply goes down, a redundant supply is switched in. This system is referred to as a "2N" system because N AC power supplies are needed to operate the system, and N additional supplies provide redundancy for each supply.

II. SUMMARY OF THE INVENTION

Systems consistent with the present invention provide multiple AC power sources to supply power over a switched path distribution system to an N+1 power supply configuration, where N is the minimum number of power supplies required for running the system.

To achieve the objectives and in accordance with the purpose of the invention, as embodied and broadly described herein, the invention comprises a system for distributing power from first and second power sources to N+1 power supplies, wherein N represents a minimum number of required power supplies, the system comprising: first sensing means for monitoring a state of the first power source; first switching means, coupled to the first sensing means, and to the first and second power sources, for selectively switching either the first or second power source to a first set of power supplies based on the state of the first power source; second sensing means for monitoring a state of the second power source; and second switching means, coupled to the second sensing means, and to the first and second power sources, for selectively switching either the first or second power source to a second set of the power supplies, different than the first set, based on the state of the second power source, wherein the first and second sets collectively include the N power supplies.

The system and methods may be used as part of a device having a requirement of N power supplies for operating. Finally, the system and methods may be used in a system having N+1 power supplies, thus providing power supply redundancy. This allows the system to stay running even when one of the power supplies goes down.

The system also includes sequence control to maintain particular sequences of operations. For example, the system monitors states of relays in the distribution system in order to open and close relays in accordance with the state of other relays in the system. The system also ensures that a relay is in the state that it has been commanded to be in and, if not, several relays in the system are forced open.

It is to be understood that both the foregoing general description and the following detailed description are exemplary and explanatory only, and do not restrict the invention, as claimed.

III. BRIEF DESCRIPTION OF THE DRAWINGS

The accompanying drawings, which are incorporated in and constitute a part of this specification, illustrate a preferred embodiment of the invention and together with the description, to explain the principles of the invention. In the drawings.

IV. DETAILED DESCRIPTION OF THE PREFERRED EMBODIMENTS

Reference will now be made in detail to preferred embodiments of the invention illustrated in the accompanying drawings.

Figure 1:
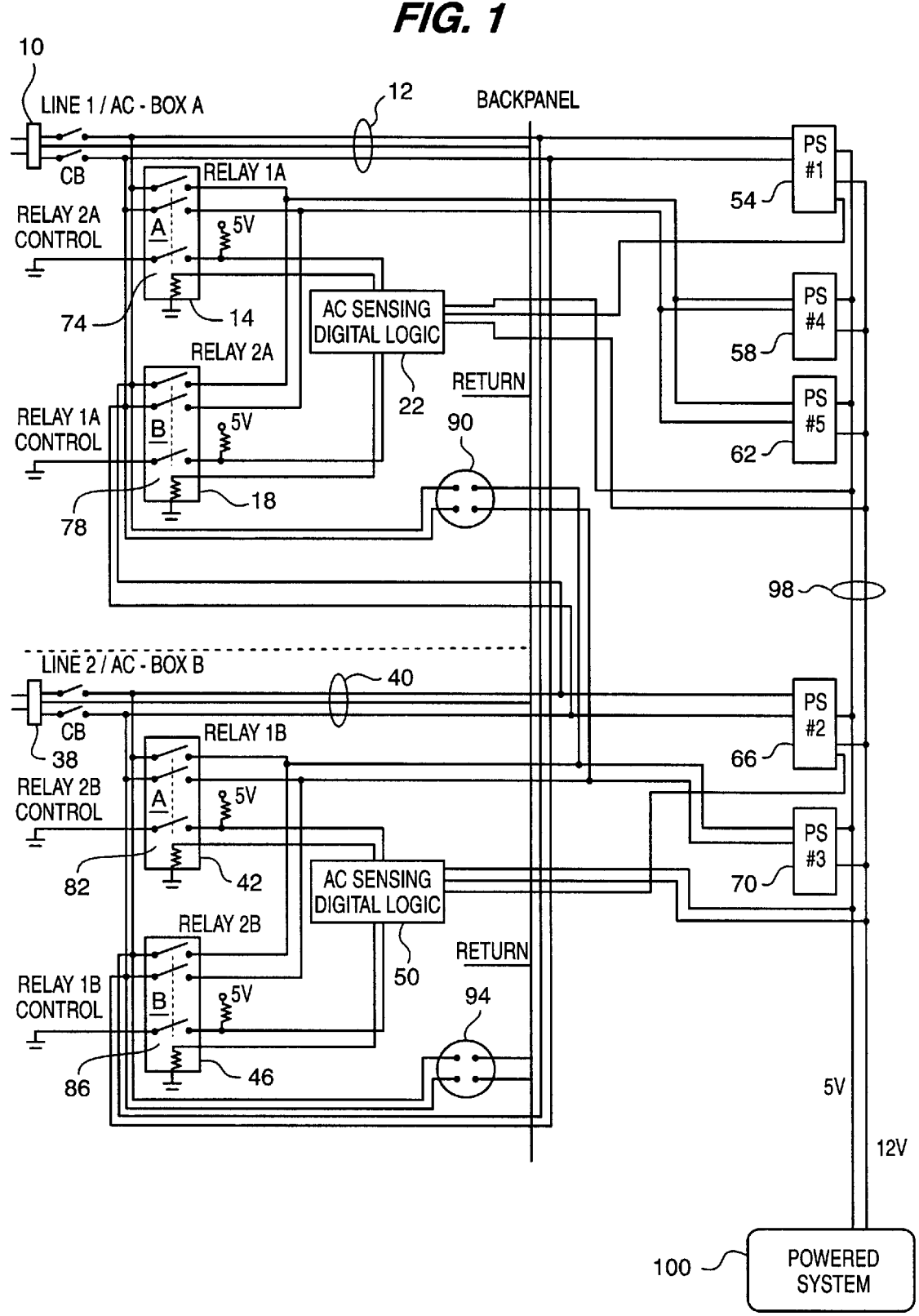
FIG. 1 is a block diagram showing an AC power distribution system having redundant power supplies consistent with a preferred embodiment of the invention.

FIG. 1 is a block diagram showing the circuitry of a preferred embodiment of the present invention. AC power coming into line boxes 10 and 38 is distributed on switched paths controlled by sensing logic 22 and 50. In a preferred embodiment the system supplies power to a RAID system, and may be implemented as part of the RAID system. Line box 10 and line box 38 are respectively connected to separate AC power sources and provide AC power to the system. Power supplies #1–#5 (elements 54, 66, 70, 58 and 62) receive the AC power from these sources through a series of lines and switches, and collectively provide as output 5 V and 12 V DC over lines 98. Power supply (PS) #1 54 is directly connected to box 10, and PS #2 66 is directly connected to box 38

Sensing logic 22 is connected directly to PS #1 54, allowing sensing logic 22 to detect the state of AC line 12. Sensing logic 22 determines the state of AC line 12 by monitoring the status of PS #1 54. When PS #1 54 is on, sensing logic 22 knows that AC line 12 is on. Sensing logic 22 is also connected directly to the 5 V and 12 V lines 98 to receive power.

Sensing logic 50 is connected directly to PS #2 66, allowing sensing logic 50 to detect the state of AC line 40. Sensing logic determines the state of AC line 40 by monitoring the status of PS #2 66. When sensing logic 50 senses PS #2 66 is on, sensing logic 50 knows that AC line 40 is on. Sensing logic 50 is also connected directly to the 5 V and 12 V lines 98 to receive power.

Line 98 is connected in parallel to each of power supplies #1–#5. Line 98 supplies power to a powered system 100, such as a RAID system.

Sensing logic 22 and sensing logic 50 may also be connected directly to AC line 12 and AC line 40, respectively (not shown), instead of, or in addition to, being connected to PS #1 54 and PS #2 66. Directly connecting the sensing logic to the AC lines permits detecting the presence of incoming AC power directly from the line.

Sensing logic 22 controls relays 14 and 18 to manage AC power distribution to PS #4 58 and PS #5 62. Relays 14 and 18 are in opposite states while power is supplied to the system and there are no error conditions present. With relay 14 closed and relay 18 open, AC line 12 supplies power to PS #4 58 and PS #5 62. With relay 14 open and relay 18 closed, AC line 40 supplies power to PS #4 58 and PS #5 62.

Sensing logic 50 controls relays 42 and 46 to manage power distribution to PS #3 70. Relays 42 and 46 are also in opposite states while power is supplied to the system. With relay 42 closed and relay 46 open, AC line 40 supplies power to PS #3 70. With relay 42 open and relay 46 closed, AC line 12 supplies power to PS #3 70.

Each of relays 14, 18, 42 and 46 has a corresponding switch 74, 78, 82 and 86 which is in the same state as the respective relay when the relay is operating properly. Using this signal, sensing logic determines the state of the respective relay. For example, if relay 14 is open, sensing logic reads 5 V on the line because of the pull up resistor. If relay 14 is closed, both lines are grounded and no signal is present.

At power up, the system initializes itself in accordance with the same principles used to respond to power failures. For example, when power is initially turned on to line box 10, this supplies power to PS #1 54. PS #1 54 being powered is sensed by sensing logic 22 over the direct connection to PS #1 54 or AC line 12 (depending upon the sensing employed). Sensing logic 22 responds by placing relay 14 in a closed state. Closing relay 14 supplies power to PS #4 58 and PS #5 62. Relay 18 is left open.

Sensing logic 50 at this time receives power on the 5 volt and 12 volt DC lines 98, but does not sense that power is supplied to either PS #2 66 or line 40 (depending upon the sensing employed). Based on this condition, sensing logic 50 ensures that relay 42 is open and relay 46 is closed, thus supplying power from line 1 to PS #3 70. If at some time later line box 38 begins supplying power, AC sense logic 50 will respond accordingly to reverse the states of relays 42 and 46 so that PS #3 70 is now supplied with power from line 40.

A similar sequence of operations occurs when power is initially supplied on line 40, and then on line 12. That is, AC sensing logic initializes relays 42 and 46 to correspond to the state of power supplied on AC line 40, and sense logic 22 initializes relays to correspond to sensing power from the power supplies, but lack of power on AC line 12.

A preferred embodiment utilizes N power supplies, and has one redundant supply, which creates an N+1 system. This handles failure of one of the power supplies. When a single supply fails, the remaining supplies provide adequate DC power to the remainder of the system. The preferred embodiment also makes use of this N+1 redundancy to handle failure in one of the AC supplies. By connecting sensing logic 22 to either PS #1 54 or power line 12, sensing logic 22 determines immediately when power on line 12 has failed. Similarly, by connecting sensing logic 50 to either PS #2 66 or power line 40, sensing logic 50 determines immediately when power on line 40 has failed. If either of the AC lines fail, the power supply connected directly to the failing line will effectively out of service, but the remaining N supplies are switched to receive power.

An AC configuration in a preferred embodiment utilizes two separate line services from a main power distribution panel, each having a line on a separate circuit breaker. In this configuration, line cord 1 is plugged into line box 10, and line cord 2 into line box 38.

If power is lost on AC line 12 for any reason, PS #1 54 immediately loses power because it is directly connected through a circuit breaker to AC line 12. Sensing logic 22, whether connected to PS #1 54 or AC line 12, immediately detects the loss of power. Since relay 14 is closed, AC line 12 power is also lost to PS #4 58 and PS #5 62, and those also go down.

In this situation, three power supplies are off line within a few milliseconds, depending upon the decay time of the capacitors in the power supply. There is, however, still power to PS #2 66 and PS #3 70, which carry the entire load for several milliseconds. This guarantees continuous DC power while selecting which AC line to provide to PS #4 58, and PS #5 62.

When sensing logic 22 detects power loss it deselects relay 14, causing it to open, and, after some time delay, selects relay 18, causing it to close. This connects AC line 40 to PS #4 58 and PS #5 62.

Using this preferred embodiment provides switching of power between lines without delaying DC power. By splitting power supplies #1–#5 between the two AC lines there is always at least some AC power being supplied to power supplies #1–#5.

From this failure mode, several events could occur. For example, if the problem on AC line 12 is corrected, and power is again brought in on AC line 12, PS #1 54 comes back up immediately and sensing logic 22 detects this. Sensing logic then deselects relay 18, causing it to open and, after some small time delay, selects relay 14 causing it to close. While relay 18 is opening and relay 14 closing, PS #4 58 and PS #5 62 go through a slight powering delay because they were getting power from AC line 40, then momentarily did not have AC power, and then had power from AC line 12. Now the system is back to a normal "on" condition, with power on both lines and power on all the power supplies.

Losing power on AC line 40 causes similar operations described above with respect to AC line 12. That is, in the normal operating condition, relay 42 is closed, relay 46 is open, and power is supplied to PS #2 66 and PS #3 70 by AC line 40. Upon AC line 40 failing, relay 42 is opened, relay 46 is closed, and power is now supplied by AC line 12 to PS #3 70. PS #2 66 no longer receives AC power because AC line 40 is down.

In FIG. 1, optional jumpers 90 and 94 allow the system of FIG. 1 to be used in an embodiment without switching capability. In the preferred embodiment of the invention, however, the jumpers are open to provide a switching system.

Figure 2:
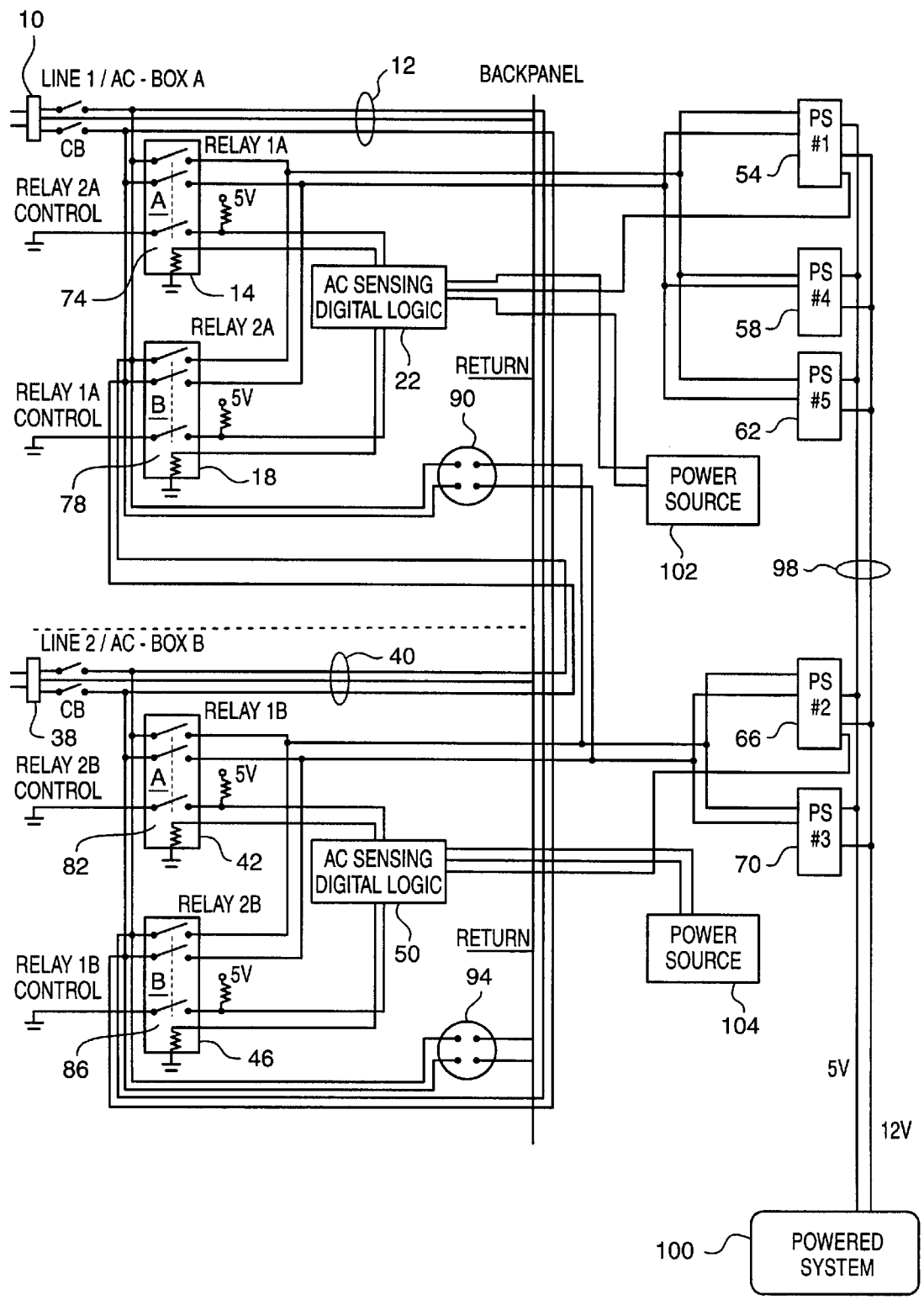
FIG. 2 is a block diagram showing an AC power distribution system having switched paths and sensing logic powered by an alternative source of power.

FIG. 2 is a second preferred embodiment. This embodiment is identical to the embodiment shown in FIG. 1, with the two exceptions. First, all power sources PS#1–PS #5 are switched. Therefore, there is no direct AC line connection to either PS #1 54 or PS #2 66. Secondly, sensing logic 22 and sensing logic 50 are connected to alternative sources of power, 102 and 104, respectively. Using this embodiment, the system provides N power supplies even when one of AC lines 12 or 40 goes down. The system may also provide power supply redundancy if there are N+1 or more power supplies.

Sensing logic 22 and 50 may also be implemented in a variety of ways. In addition to the two types of sensing discussed above, sensing logic 22 and 50 may provide more robust sensing by sensing whether the relays are operating correctly. For example, sensing logic may sense that the relays are opening or closing, not opening or not closing, or stuck. If any of these conditions are detected, and the conditions contradict the correct sequence of powering, as discussed below, a default procedure could be undertaken, such as forcing both relays open to prevent shorting.

Figure 3:
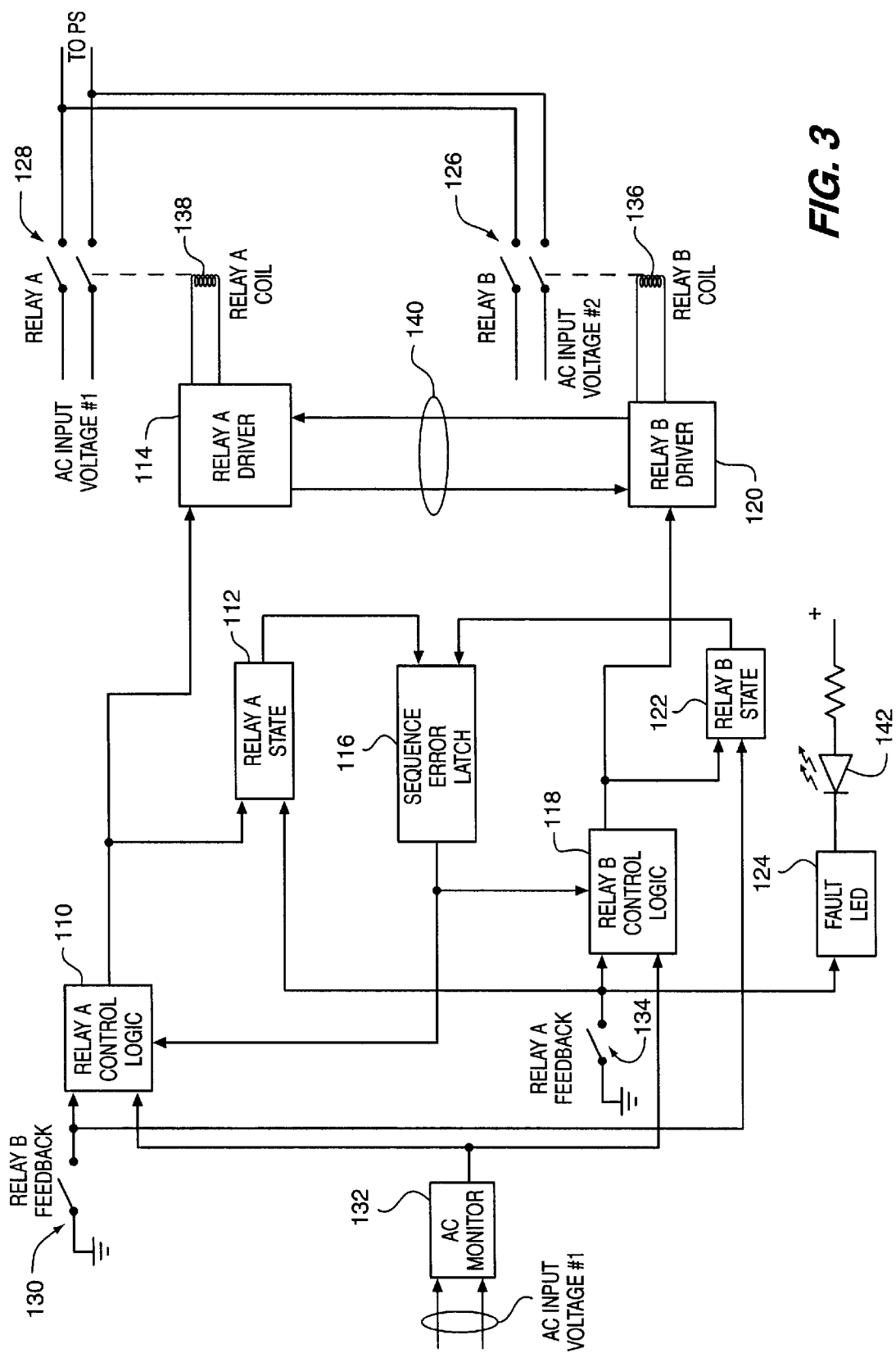
FIG. 3 is a block diagram showing an AC sensing and logic system consistent with a preferred embodiment of the invention.

FIG. 3 is a block diagram showing a preferred embodiment of sensing logic 22 or 50 of FIG. 1 or FIG. 2. For convenience, the power relays are denoted by "A" and "B," and correspond, for example, to relays 14 and 18 in FIG. 1. AC monitor 132 is connected to the incoming AC line, such as line 12 in FIG. 1. AC monitor 132 may alternatively be connected to a power supply connected to the incoming AC line.

Relay A control logic 110 receives input from the relay B feedback 130, the AC monitor 132, and the sequence error latch 116. Relay B feedback 130 should always be in the same state as relay B. If AC monitor 132 indicates power is on the line, and relay B feedback 130 indicates relay B is open, relay A control logic 110 sends a signal to relay A driver 114 to close relay A 128, thus supplying power from a first AC line. Ensuring that relay B 126 is open before closing relay A prevents simultaneously closing both sets of relays. When AC monitor 32 indicates power is off, relay A control logic sends a signal to relay A driver 114 to open relay A 128.

Relay B control logic 118 operates in a similar fashion. Relay B control logic 118 receives input from the relay A feedback 134, AC monitor 132, and sequence error latch 116. Relay A feedback 134 should always be in the same state as relay A. If AC monitor 132 indicates the power is off, and relay A feedback 134 indicates relay A is open, relay B control logic 118 sends a signal to relay B driver 120 to close relay B 126, thus supplying power from a second AC line. Ensuring that relay A 128 is open before closing relay B prevents simultaneously closing both sets of relays. When AC monitor 32 indicates power is on, relay B control logic sends a signal to relay B driver 120 to open relay B 126.

Relay A state circuit 112 is connected to the output of relay A control logic 110 and relay A feedback 134, and detects the condition when relay A control logic is on, but relay A is not closed. This state indicates an error condition, which is sent to sequence error latch 116.

Similarly, relay B state circuit 122 is connected to the output of relay B control logic 118 and relay B feedback 130, and detects a condition when relay B control logic is on, but relay B is not closed. This state indicates an error condition to sequence error latch 116.

Sequence latch 116 receives the input conditions from relay A state 112 and relay B state 122, and outputs a signal directing each of relay A control logic 110 and relay B control logic 118 to force open relays A and B, respectively. This insures that any detected improper sequence in powering relays results in discontinuing supplying power to the system.

Lines 140 provide a safety interlock to prevent driving both relays at the same time. The sensor also has fault LED driver 124 which drives LED 142 when AC power is off, as indicated by relay feedback 134 indicating relay 1 is open. This provides a visual indicator of the state of the AC line 1 in the system.

The principles discussed herein may be used in a variety of power supply and distribution architectures. For example, if more power is needed, the system can scale up by distributing power supplies evenly between the two lines. Another preferred embodiment may be made by adding more DC power supplies, and stringing them between AC power cords without departing from the spirit and scope of the invention. The actual number of supplies may depend on size constraints of the particular system. If more power was needed, such as ten power supplies, five supplies could go on one AC line. For example, PS #1 54 and PS #2 66 could be connected as shown and described above, and the other supplies would be distributed on the lines.

The present invention is also scalable down. All configurations may not need five power supplies. Fewer drives or controllers require less power and fewer power supplies. For example, if a subsystem only needed three power supplies, a fourth supply could be added for redundancy.

In FIG. 1 or FIG. 2, PS #5 62 could be pulled out and the same function would be provided. The system of FIG. 1 could also be scaled down further, to a subsystem running on two supplies with a third for redundancy. PS #1 54 and PS #2 66, with PS #3 70, would provide the same capability as a system with all five supplies.

On the AC side, a system using multiple sources of AC input could be built without departing from the spirit and scope of the invention. For example, a system may have several independent sources of power, such as independent wall receptacles, an uninterruptable power source, and a generator. The sensing logic would sequence and steer between these line cords to pick the right combination of line cords to provide AC to the power supplies.

In a preferred embodiment, relays 14, 18, 42 and 46, use a 3 mm gap to ensure maximum safety. For example, if power has been lost on AC line 12, PS #1 54 is down, and PS #2 66, PS #3 70, PS #4 58 and PS #5 62 are up, there is no power on AC line 12, and the circuit breaker on AC line 12 is still closed. Power is coming in AC line 40, into relay 18, which is closed now during failure of AC line 12. This creates a node where relay 18 and relay 14 connect (to the right of the relays in FIG. 1). Relay 14 is open at this time. In this condition, when the circuit breaker is still closed but there is no power, relay 18 is closed and relay 14 is open, relay 14 is a primary disconnect, which must be 3 mm or greater. If it is not, a person could unplug power cord for AC line 12 from the wall, and grab the contacts, creating a chance of arcing and electrocuting the person.

V. CONCLUSION

Other embodiments of the invention will be apparent to those skilled in the art from consideration of the specification and practice of the disclosed embodiments. The specification and examples are exemplary only, and the true scope and spirit of the invention is defined by the following claims and their equivalents.

We claim:

1. A system for distributing power from first and second power sources to N power supplies, where N represents a minimum number of required power supplies, the system comprising:

first sensing means for monitoring a state of the first power source;

first switching means, coupled to the first sensing means and to the first and second power sources, for selectively switching either the first or second power source to a first set of power supplies based on the state of the first power source;

second sensing means for monitoring a state of the second power source; and second switching means, coupled to the second sensing means and to the first and second power sources, for selectively switching either the first or second power source to a second set of the power supplies, different than the first set, based on the state of the second power source, wherein the first and second sets collectively include the N power supplies.

2. The system of claim 1, wherein the first switching means includes:

a first relay coupled between the first power source and the first set of power supplies; and a second relay coupled between the second power source and the first set of power supplies.

3. The system of claim 2, wherein the first sensing means includes:

control means for ensuring a predetermined sequencing of operation of said first and second relays.

4. The system of claim 3, wherein the control means includes:

first relay state means, coupled to the first relay, for determining a state of the first relay;

second relay state means, coupled to the second relay, for determining a state of the second relay;

a first control circuit coupled to the first relay and the second relay state means, for sending a control signal to control the first relay in response to the state of the first power source and the state of the second relay; and a second control circuit coupled to the second relay and the first relay state means, for sending a control signal to control the second relay in response to the state of the first power source and the state of the first relay.

5. The system of claim 4, wherein the control means further includes:

first state monitor means for determining whether the control signal from the first control circuit is consistent with the state of the first relay; and second state monitor means for determining whether the control signal from the second control circuit is consistent with the state of the second relay.

6. The system of claim 5, wherein the control means further includes:

sequence error detection means for forcing the state of both relays in response to the first or second state monitor determining the respective control signal is not consistent with the state of the corresponding relay.

7. The system of claim 1, wherein the second switching means includes:

a first relay coupled between the first power source and the second set of power supplies; and a second relay coupled between the second power source and the second set of power supplies.

8. The system of claim 7, wherein the second sensing means includes:

control means for ensuring a predetermined sequencing of operation of said first and second relays.

9. The system of claim 8, wherein the control means includes:

first relay state means, connected to the first relay, for determining a state of the first relay;

second relay state means, connected to the second relay, for determining a state of the second relay;

a first control circuit, connected to the first relay and the second relay state means, for sending a control signal to control the first relay in response to the state of the second power source and the state of the second relay; and a second control circuit, connected to the second relay and the first relay state means, for sending a control signal to control the second relay in response to the state of the second power source and the state of the first relay.

10. The system of claim 9, wherein the control means further includes:

first state monitor means for determining whether the control signal from the first control circuit is consistent with the state of the first relay; and second state monitor means for determining whether the control signal from the second control circuit is consistent with the state of the second relay.

11. The system of claim 10, wherein the control means further includes:

sequence error detection means for forcing the state of both relays in response to the first or second state monitor determining the control signal is not consistent with the state of the corresponding relay.

12. An apparatus comprising:

an electric device receiving electric power;

N power supplies, connected to the electric device to supply electric power, where N represents a minimum number of required power supplies for powering the electronic device; and a power distribution system, coupled to power supplies for distributing power from first and second power sources to the N power supplies, the system comprising:

first sensing means for monitoring a state of the first power source;

first switching means, coupled to the first sensing means and to the first and second power sources, for selectively switching either the first or second power source to a first set of power supplies based on the state of the first power source;

second sensing means for monitoring a state of the second power source; and second switching means, coupled to the second sensing means and to the first and second power sources, for selectively switching either the first or second power source to a second set of the power supplies, different than the first set, based on the state of the second power source, wherein the first and second sets collectively include N power supplies.

13. The device of claim 12, wherein the first switching means includes:

a first relay coupled between the first power source and the first set of power supplies; and a second relay coupled between the second power source and the first set of power supplies.

14. The device of claim 13, wherein the first sensing means includes:

control means for ensuring a predetermined sequencing of operation of said first and second relays.

15. The device of claim 14, wherein the control means includes:
  first relay state means, coupled to the first relay, for determining a state of the first relay;
  second relay state means, coupled to the second relay, for determining a state of the second relay;
  a first control circuit, coupled to the first relay and the second relay state means, for sending a control signal to control the first relay in response to the state of the first power source and the state of the second relay; and
  a second control circuit for sending a control signal to control the second relay in response to the state of the first power source and the state of the first relay.

16. The device of claim 15 wherein the control means further includes:
  first state monitor means for determining whether the control signal from the first control circuit is consistent with the state of the first relay; and
  second state monitor means for determining whether the control signal from the second control circuit is consistent with the state of the second relay.

17. The device of claim 16, wherein the control means further includes:
  sequence error detection means for forcing the state of both relays in response to the first or second state monitor determining the respective control signal is not consistent with the state of the corresponding relay.

18. The device of claim 12, wherein the second switching means includes:
  a first relay coupled between the first power source and the second set of power supplies; and
  a second relay coupled between the second power source and the second set of power supplies.

19. The device of claim 18, wherein the second sensing means includes:
  control means for ensuring a predetermined sequencing of operation of said first and second relays.

20. The device of claim 19, wherein the control means includes:
  first relay state means, connected to the first relay, for determining a state of the first relay;
  second relay state means, connected to the second relay, for determining a state of the second relay;
  a first control circuit, connected to the first relay and the second relay state means, for sending a control signal to control the first relay in response to the state of the second power source and the state of the second relay; and
  a second control circuit, connected to the second relay and the first relay state means, for sending a control signal to control the second relay in response to the state of the second power source and the state of the first relay.

21. The device of claim 20, wherein the control means further includes:
  first state monitor means for determining whether the control signal from the first control circuit is consistent with the state of the first relay; and
  second state monitor means for determining whether the control signal from the second control circuit is consistent with the state of the second relay.

22. The device of claim 21, wherein the control means further includes:
  sequence error detection means for forcing the state of both relays in response to the first or second state monitor determining the control signal is not consistent with the state of the corresponding relay.

23. A device for controlling power from first and second power sources to N+1 power supplies, wherein N represents a minimum number of required power supplies, the device comprising:
  first power line means for connecting the first power source and a first one of the N+1 power supplies;
  second power line means for connecting the second power source and a second one of the N+1 power supplies;
  first sensing means for monitoring a state of the first power line means;
  first switching means, coupled to the first sensing means and to the first and second power line means, for selectively switching either the first or second power line means to a first set of power supplies based on the state of the first power line means, wherein the first set does not include the first or second power supplies;
  second sensing means for monitoring a state of the second power line means; and
  second switching means, coupled to the second sensing means and to the first and second power line means, for selectively switching either the first or second power line means to a second set of the power supplies, different than the first set, based on the state of the second power line means, wherein the second set does not include the first or second power supplies.

24. The device of claim 23, wherein the first switching means includes:
  a first relay coupled between the first power line means and the first set of power supplies; and
  a second relay coupled between the second power line means and the first set of power supplies.

25. The device of claim 24, wherein the first sensing means includes:
  control means for ensuring a predetermined sequencing of operation of said first and second relays.

26. The device of claim 25, wherein the control means includes:
  first relay state means, connected to the first relay, for determining a state of the first relay;
  second relay state means, connected to the second relay, for determining a state of the second relay;
  a first control circuit, connected to the first relay and the second relay state means, for sending a control signal to control the first relay in response to the state of the first power line means and the state of the second relay; and
  a second control circuit, connected to the second relay and the first relay state means, for sending a control signal to control the second relay in response to the state of the first power line means and the state of the first relay.

27. The device of claim 26, wherein the control means further includes:
  first state monitor means for determining whether the control signal from the first control circuit is consistent with the state of the first relay; and
  second state monitor means for determining whether the control signal from the second control circuit is consistent with the state of the second relay.

28. The device of claim 27, wherein the control means further includes:
  sequence error detection means for forcing the state of both relays in response to the first or second state monitor determining the respective control signal is not consistent with the state of the corresponding relay.

29. The device of claim 23, wherein the second switching means includes:

a first relay coupled between the first power line means and the second set of power supplies; and a second relay coupled between the second power line means and the second set of power supplies.

30. The device of claim 29, wherein the second sensing means includes:

control means for ensuring a predetermined sequencing of operation of said first and second relays.

31. The device of claim 30, wherein the control means includes:

first relay state means, connected to the first relay, for determining a state of the first relay;

second relay state means, connected to the second relay, for determining a state of the second relay;

a first control circuit, connected to the first relay and the second relay state means, for sending a control signal to control the first relay in response to the state of the second power line means and the state of the second relay; and a second control circuit, connected to the second relay and the first relay state means, for sending a control signal to control the second relay in response to the state of the second power line means and the state of the first relay.

32. The device of claim 31, wherein the control means further includes:

first state monitor means for determining whether the control signal from the first control circuit is consistent with the state of the first relay; and second state monitor means for determining whether the control signal from the second control circuit is consistent with the state of the second relay.

33. The device of claim 32, wherein the control means further includes:

sequence error detection means for forcing the state of both relays in response to the first or second state monitor determining the control signal is not consistent with the state of the corresponding relay.

34. A method of distributing power from first and second power sources to N power supplies, where N represents a minimum number of required power supplies, the system comprising steps of:

monitoring a state of the first power source;

selectively switching either the first or second power source to a first set of power supplies based on the state of the first power source;

monitoring a state of the second power source; and selectively switching either the first or second power source to a second set of the power supplies, different than the first set, based on the state of the second power source, wherein the first and second sets collectively include all N power supplies.

35. The method of claim 34, wherein the step of selectively switching either the first or second power source to a first set of power supplies includes a substep of:

ensuring a predetermined sequencing of operation of said first and second relays.

36. The method of claim 35, wherein the step of ensuring a particular sequencing of operation of said first and second relays includes substeps of:

determining a state of the first relay;

determining a state of the second relay;

sending a control signal to control the first relay in response to the state of the first power source and the state of the second relay; and sending a control signal to control the second relay in response to the state of the first power source and the state of the first relay.

37. The method of claim 36, wherein the step of ensuring a particular sequencing of operation of said first and second relays includes substeps of:

determining whether the control signal from the first control circuit is consistent with the state of the first relay; and determining whether the control signal from the second control circuit is consistent with the state of the second relay.

38. The method of claim 37, wherein the step of ensuring a particular sequencing of operation of said first and second relays further includes a substep of:

forcing open both relays in response to determining the respective control signal is not consistent with the state of the corresponding relay.

39. The method of claim 34, wherein the step of monitoring a state of the second power source includes a substep of:

ensuring a particular sequencing of operation of said first and second relays.

40. The method of claim 39, wherein the step of ensuring a particular sequencing of operation includes substeps of:

determining a state of the first relay;

determining a state of the second relay;

sending a control signal to control the first relay in response to the state of the second power source and the state of the second relay; and sending a control signal to control the second relay in response to the state of the second power source and the state of the first relay.

41. The method of claim 40, wherein the step of ensuring a particular sequencing of operation includes substeps of:

determining whether the control signal from the first control circuit is consistent with the state of the first relay; and determining whether the control signal from the second control circuit is consistent with the state of the second relay.

42. The method of claim 41, wherein the step of ensuring a particular sequencing of operation includes a substep of:

forcing both relays to a predetermined state in response to the first or second state monitor determining the control signal is not consistent with the state of the corresponding relay.

43. A system for distributing power from first and second power sources to N power supplies, where N represents a minimum number of required power supplies, the system comprising:

first sensing element for monitoring a state of the first power source;

first switching element, coupled to the first sensing element and to the first and second power sources, for selectively switching either the first or second power source to a first set of power supplies based on the state of the first power source;

second sensing element for monitoring a state of the second power source; and second switching element, coupled to the second sensing element and to the first and second power sources, for selectively switching either the first or second power source to a second set of the power supplies, different than the first set, based on the state of the second power source, wherein the first and second sets collectively include the N power supplies.

44. The system of claim 43, wherein the first switching element includes:
   a first relay coupled between the first power source and the first set of power supplies; and
   a second relay coupled between the second power source and the first set of power supplies.

45. The system of claim 44, wherein the first sensing element includes:
   a control element for ensuring a predetermined sequencing of operation of said first and second relays.

46. The system of claim 45, wherein the control element includes:
   first relay state element, coupled to the first relay, for determining a state of the first relay;
   second relay state element, coupled to the second relay, for determining a state of the second relay;
   a first control circuit coupled to the first relay and the second relay state element, for sending a control signal to control the first relay in response to the state of the first power source and the state of the second relay; and
   a second control circuit coupled to the second relay and the first relay state element, for sending a control signal to control the second relay in response to the state of the first power source and the state of the first relay.

47. The system of claim 46, wherein the control element further includes:
   first state monitor element for determining whether the control signal from the first control circuit is consistent with the state of the first relay; and
   second state monitor element for determining whether the control signal from the second control circuit is consistent with the state of the second relay.

48. The system of claim 47, wherein the control element further includes:
   sequence error detection element for forcing the state of both relays in response to the first or second state monitor determining the respective control signal is not consistent with the state of the corresponding relay.

49. The system of claim 43, wherein the second switching element includes:
   a first relay coupled between the first power source and the second set of power supplies; and
   a second relay coupled between the second power source and the second set of power supplies.

50. The system of claim 49, wherein the second sensing element includes:
   a control element for ensuring a predetermined sequencing of operation of said first and second relays.

51. The system of claim 50, wherein the control element includes:
   first relay state element, connected to the first relay, for determining a state of the first relay;
   second relay state element, connected to the second relay, for determining a state of the second relay;
   a first control circuit, connected to the first relay and the second relay state element, for sending a control signal to control the first relay in response to the state of the second power source and the state of the second relay; and
   a second control circuit, connected to the second relay and the first relay state element, for sending a control signal to control the second relay in response to the state of the second power source and the state of the first relay.

52. The system of claim 51, wherein the control element further includes:
   first state monitor element for determining whether the control signal from the first control circuit is consistent with the state of the first relay; and
   second state monitor element for determining whether the control signal from the second control circuit is consistent with the state of the second relay.

53. The system of claim 52, wherein the control element further includes:
   sequence error detection element for forcing the state of both relays in response to the first or second state monitor determining the control signal is not consistent with the state of the corresponding relay.

\* \* \* \* \*